(12) United States Patent
Vollebregt et al.

(10) Patent No.: US 6,195,851 B1
(45) Date of Patent: Mar. 6, 2001

(54) HOOK WITH LOCKING MEANS

(75) Inventors: John Vollebregt; Daniel Durning, both of Brantford (CA)

(73) Assignee: Volco Inc., Brantford (CA)

( * ) Notice: Subject to any disclaimer, the term of this patent is extended or adjusted under 35 U.S.C. 154(b) by 0 days.

(21) Appl. No.: 09/270,525

(22) Filed: Mar. 17, 1999

(51) Int. Cl.$^7$ ............................ A47H 13/04; E04D 13/00
(52) U.S. Cl. ........................... 24/369; 24/338; 24/600.9; 24/716
(58) Field of Search .............................. 24/369, 338, 716, 24/600.2, 600.9

(56) References Cited

U.S. PATENT DOCUMENTS

| | | | |
|---|---|---|---|
| 0,025,082 | * | 8/1859 | Pollak .................................. 24/600.9 |
| 2,357,478 | * | 9/1944 | Koch ................................... 24/600.9 |
| 3,561,037 | * | 2/1971 | Hachtel ................................. 24/716 |
| 4,464,813 | * | 8/1984 | Bakker et al. ......................... 24/237 |
| 4,691,416 | * | 9/1987 | Nakayama et al. ................... 24/90 B |
| 5,469,607 | | 11/1995 | Henningsson et al. ................ 24/716 |
| 5,761,776 | | 6/1998 | Vollebregt . |

FOREIGN PATENT DOCUMENTS

| | | | |
|---|---|---|---|
| 2626748 | * | 12/1977 | (DE) ..................................... 24/600.9 |
| 1188738 | | 9/1959 | (FR) . |
| WO 9212621 | | 8/1992 | (WO) . |

OTHER PUBLICATIONS

Brochure: LS Americas Accessories, P.O. Box 19548, Charlotte, NC 29219.

* cited by examiner

Primary Examiner—Victor N. Sakran
(74) Attorney, Agent, or Firm—Santosh K. Chari; Orange & Chari

(57) ABSTRACT

A hook for suspending from a support, such as a rod or wire, a retractable roof covering such as that used for greenhouses, comprises a generally C-shaped body including a pin for engaging the covering, a cavity for retaining the rod or wire, an opening for the cavity, and a means for locking the pin opposite of the opening.

13 Claims, 6 Drawing Sheets

HOOK WITH LOCKING MEANS

BACKGROUND OF THE INVENTION

1. Field of the Invention

The preset invention relates to hooks for supporting retractable roof coverings used on greenhouses. More specifically, the invention relates to such hooks which have are designed to separate the roof covering and/or any reinforcing tape material from the suspension wire and a locking means to prevent unfastening and to increase the hook's holding capacity.

2. Description of the Prior Art

In greenhouses, it is common for the roofs to be retractable and made of a fabric covering which can be pleated or folder Such roof coverings are typically made of woven polyethylene or polypropylene and are suspended, by means of hooks, from wires or rods extending along the top of the greenhouse. Normally, such hooks are connected to a reinforcing tape which is then attached to the roof fabric.

In greenhouses having such a fabric roof covering, it is common for wind to cause the roof covering material to billow or flap thereby causing that part of the covering or reinforcing tape material which is joined to the book to rub against the suspending rod or wire, which, in turn, damages such material due to abrasion. Hooks having a means of separating the fabric from the wire have been proposed but involve a complicated method of assembly or use. Further, since many of the known hooks do not have a locking means, it is also common for such hooks to be disengaged from the supporting rod or wire or for the roof covering to slip off. In addition, those hooks that do have a locking means can only be locked on site which, as discussed below, results in various disadvantages.

Various hooks have been proposed to address these individual problems; however, no one device has provided an adequate solution to both.

For example, in U.S. Pat. No. 5,761,776 (which is commonly owned with the present invention), there is described a hook having an integral separator. Although such hook achieves the stated purpose, the means for attaching the hook to the reinforcing tape of the roof covering requires manual manipulation of the pin in a plane perpendicular to that of the hook. Due to the required strength of the hook material, such manipulation is rendered difficult.

Another disadvantage with this hook is that the locking of the pin prevents both the roof covering as well as the suspension wire from being disengaged. Thus, the pin may only be locked after the hook is attached to the suspension wire thereby causing the manipulation of the pin to be more difficult since it must be done onsite and overhead. Further, the Red manipulation of such hook makes it difficult to design a machine to perform the required manipulations.

Therefore, a need exists for an improved hook for roof coverings and the like which overcomes the disadvantages of the known devices.

SUMMARY OF INVENTION

The present invention provides a hook for suspending a fabric roof covering from a support, said hook comprising:
a generally planar C-shaped body, having front and rear ends, said body being defined by first and second opposed members and a third member connecting said first and second members, said first, second and third members defining a cavity with an opening on the front end of the body; and,
a pin extending from the first member, said pin extending away from said opening and towards the rear end of the body;
wherein said third member includes a means for locking the pin and wherein said means for locking the pin faces the rear end of the body.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
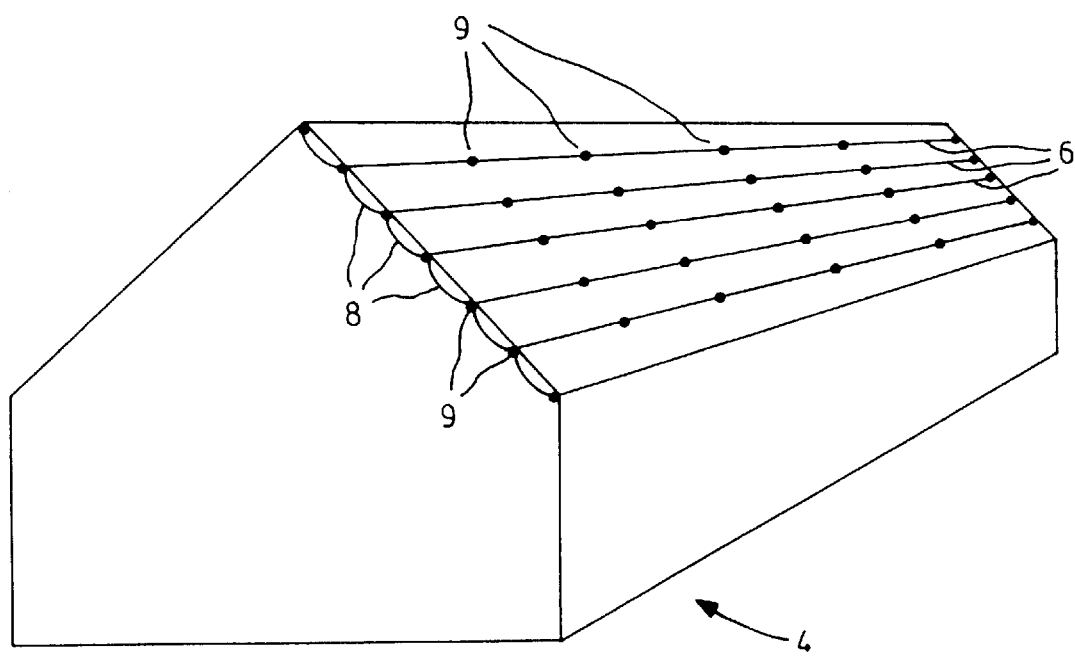
FIG. 1 is a perspective view of a greenhouse having a retractable fabric roof.

FIG. 1 illustrates a greenhouse having a roof comprised of a retractable fabric. The greenhouse 4 includes a series of suspension wires 6 which extend along the length of the greenhouse connecting the tops of the end walls thereof. The wires 6 thereby form a series of supports for a fabric 8 which is suspended from the wires 6 by means of a plurality of hooks 9. In FIG. 1, the roof is shown in the closed position. When it is desired to open the roof, that is to expose the interior of the greenhouse, the fabric is retracted along the wires 6 to the desired position. As is common, reinforcing tapes are used to on the roof covering. The hooks used to hang the covering are first attached to the reinforcing tape and, subsequently, the tape is sewn onto the roof covering.

Figure 2:
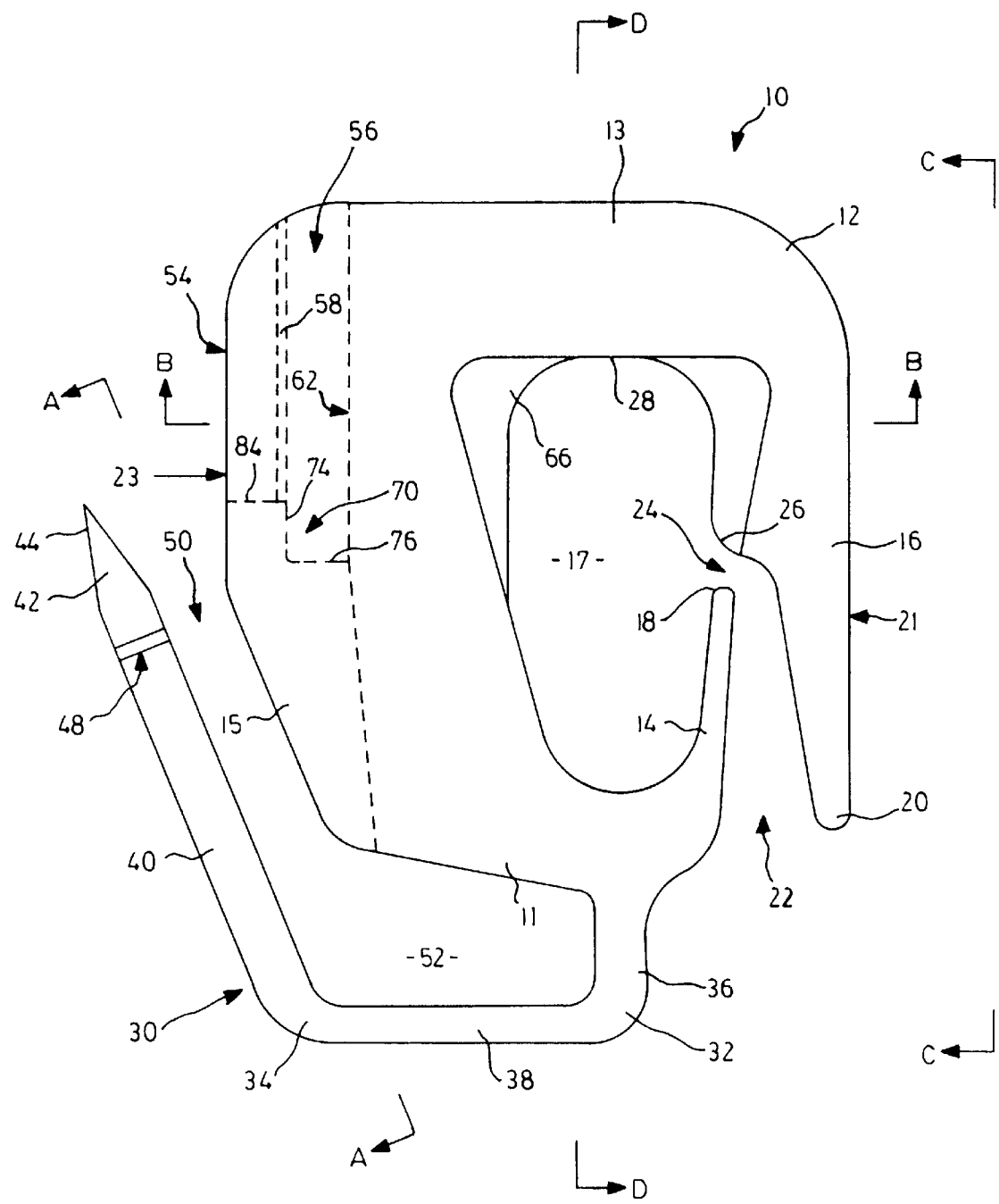
FIG. 2 is side view of a hook according to a preferred embodiment of the invention when in an unlocked position.

It should be noted that the present description of invention refers to the orientation of the hook as shown in FIG. 2, which illustrates the hook, according to a preferred embodiment, as it would appear when engaged on a suspension wire. Other orientations will be apparent to those skilled in the art notwithstanding the terms used herein, which are only for the purposes of describing the preferred embodiment of the hook. Accordingly, the descriptive terms used herein such as "top" and "bottom" etc. are not to be considered as limiting the orientation of the hook.

In FIG. 2, a one piece hook according to a preferred embodiment of the invention is shown generally at 10. In the preferred embodiment, the hook has a main body 12, having a generally planar, C-shaped body defined by bottom and top members 11 and 13, respectively, joined by a side member 15, which surround a first cavity 17, which receives the suspension wire. The hook has a front end 21 and a rear end 23.

The bottom and top members 11 and 13 are formed with first and second terminal arms 14 and 16, respectively. First and second arms 14 and 16 are arranged in an opposing manner and terminate with first and second ends 18 and 20, respectively. Further, second arm 16 extends beyond first end 18 so that the second end 20 overlaps first end 18 and is spaced outwardly therefrom. This arrangement results in a first, wire receiving, channel 22 being defined between the first and second arms 14 and 16. The channel 22 leads to an opening 24 created by a separation between the first end 18 and a bend 26 in the inner side of the second arm 16. The opening 24 provides a means of communication between the channel 22 and the cavity 17 of the hook 10. As will be described below, the wire receiving channel 22 and the opening 24 serve to direct a suspension wire into the cavity 17 and, thereby, to engage the hook onto such wire. In the preferred embodiment the opening 24 is smaller than the diameter of the suspension wire and the first arm 14 is made of a resilient material. In this manner, the wire is forced through the opening 24 by deflecting the fist arm 14 inwards towards the cavity 17. Once inside the cavity, the hook is suspended from the wire such that the wire is contacted against the bottom surface 28 of the top member 13. In this position, the wire is prevented from inadvertently passing back through the opening 24.

As shown in FIG. 2, in the preferred embodiment of the invention, the first channel 22 extends downward. Such arrangement facilitates the attachment of the hook to the suspension wire. That is, since the hook is attached to the wire after the roofing material is attached, the user need simply raise the hook above the wire and guide the wire into the first channel 22. The hook is then snapped onto the wire by passing the wire through the channel 22 and the opening 24 and, finally, to enter first cavity 17.

From the bottom member 11 of the body 12 extends a pin 30, which includes two generally 90° bends 32 and 34 arranged so that the pin 30 includes a downwardly extending first portion 36, a transverse second portion 38 and an upwardly extending third portion 40. As indicated previously, the descriptive terms relating to the hook's orientation are only used to facilitate the description of the invention and are not intended to imply that only one orientation of the hook is possible. The pin 30 is formed so that the third portion 40 lies adjacent the side member 15, and next to the rear end 23 of the hook. The members 36, 38 and 40 of the pin 30 are formed of a resilient material so as to allow manipulation of the pin while still providing the required strength to support the roof covering being suspended therefrom.

Figure 3:
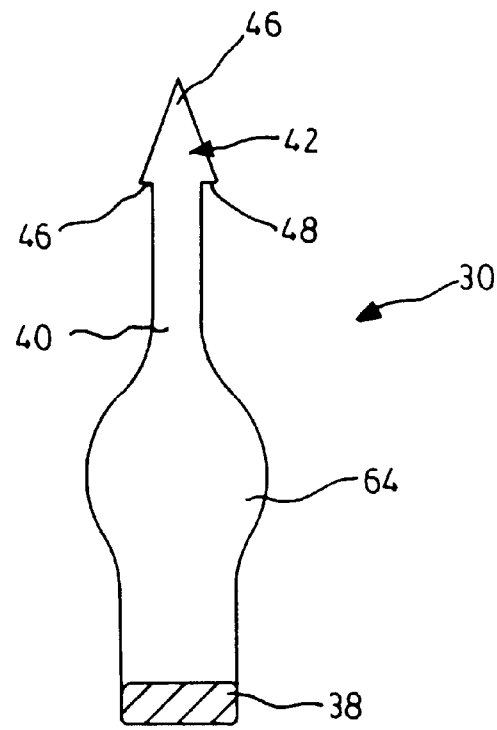
FIG. 3 is a side view of the hook of FIG. 2 taken along the line A—A.

As best illustrated in FIG. 3, in the preferred embodiment, the third portion 40 of the pin 30 terminates in a head 42 generally in the shape of an arrowhead with a pointed end 44 and barbs 46 and 48. The purpose of such a head will be discussed below and it will be apparent to persons skilled in the art that other embodiments of the invention may have pin heads of different shapes while still maintaining the desired functional characteristics.

Returning to FIG. 2, as shown, the arrangement described above of the pin 30 creates a second, reinforcing tape receiving, channel 50 on the hook, which opens into a second, reinforcing tape receiving cavity 52. As shown the preferred embodiment of the hook has a reinforcing tape receiving channel 50 which is on the opposite side of the wire receiving channel 22. This arrangement facilitates the engagement of the hook onto the suspension wire and to the tape. Although the above discussion has referred to "enforcing tape" or "tape" receiving portions of the hook, it will be understood that such terminology will also include any other such component which is used with roof coverings of the type to which the invention is directed. In addition, although not the preferred embodiment, it will be appreciated that some sons may exist where no reinforcing tape is used and where the hooks are attached directly to the roof covering material.

Figure 4:
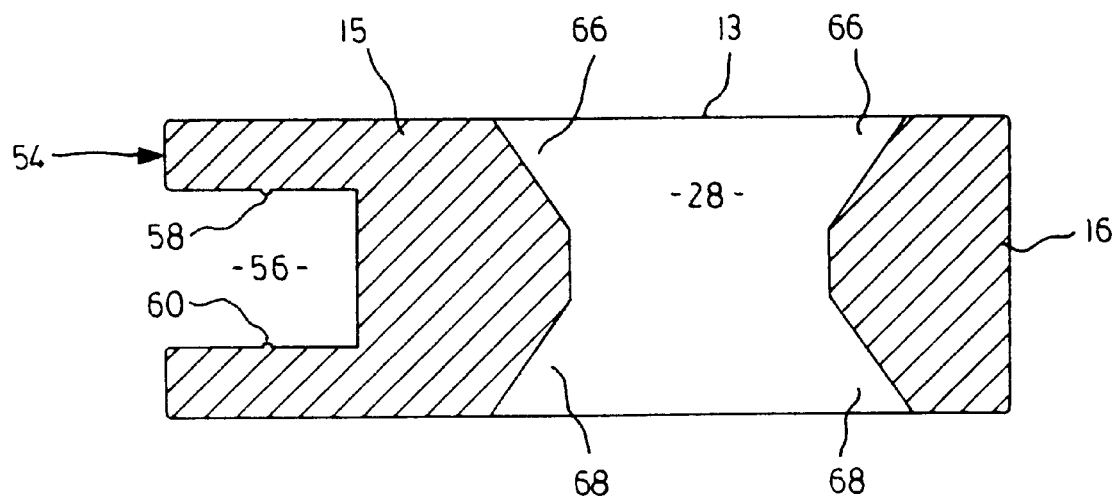
FIG. 4 is a bottom cross sectional view of the hook of FIG. 2 along the line B—B.
Figure 5:
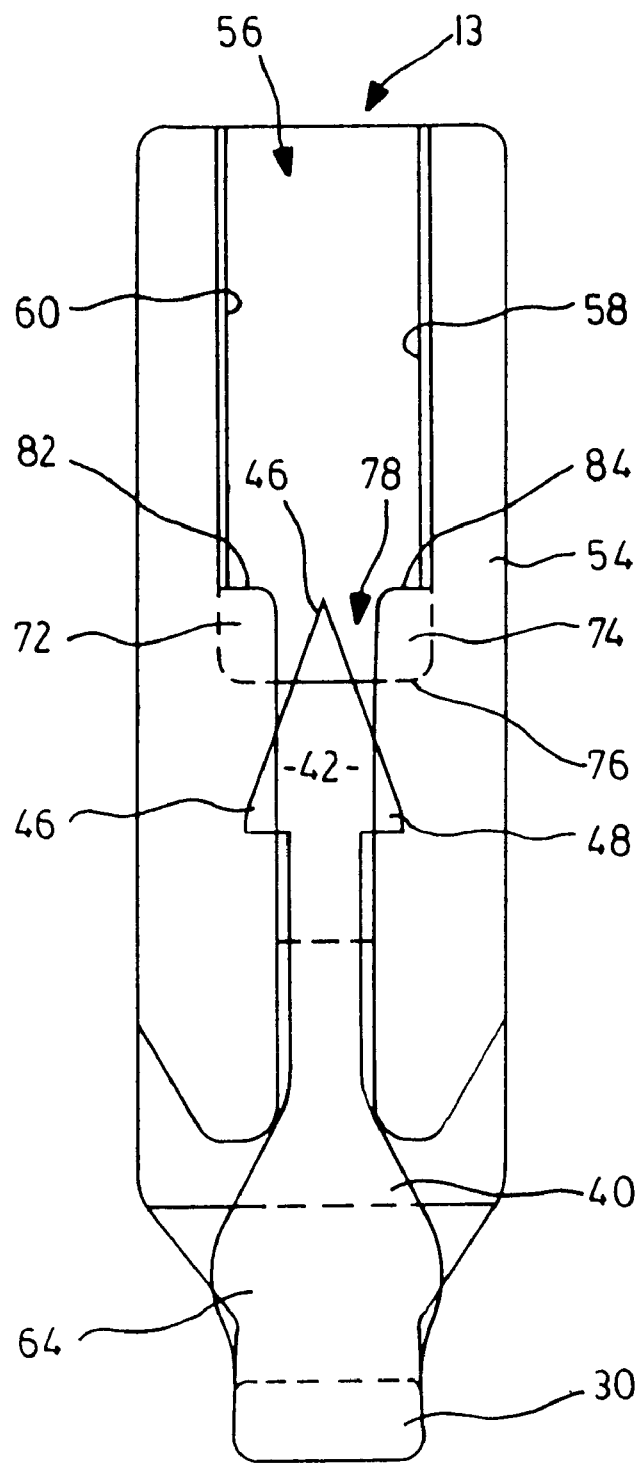
FIG. 5 is a side view of the hook of FIG. 2.
Figure 6:
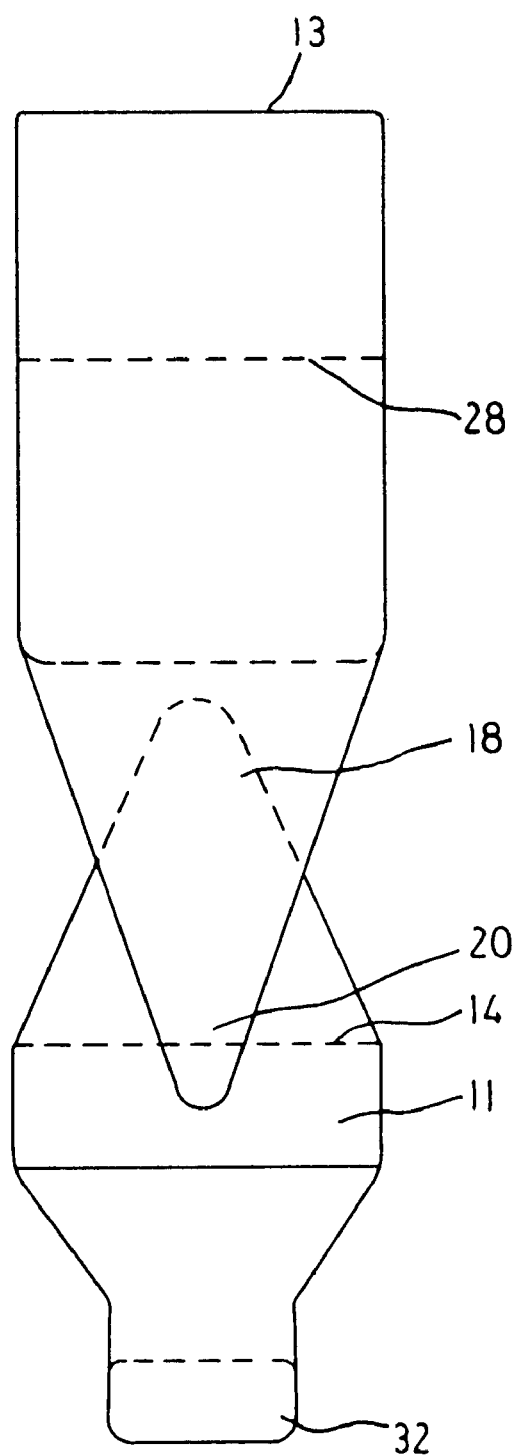
FIG. 6 is a side view of the hook of FIG. 2 along the line C—C.
Figure 7:
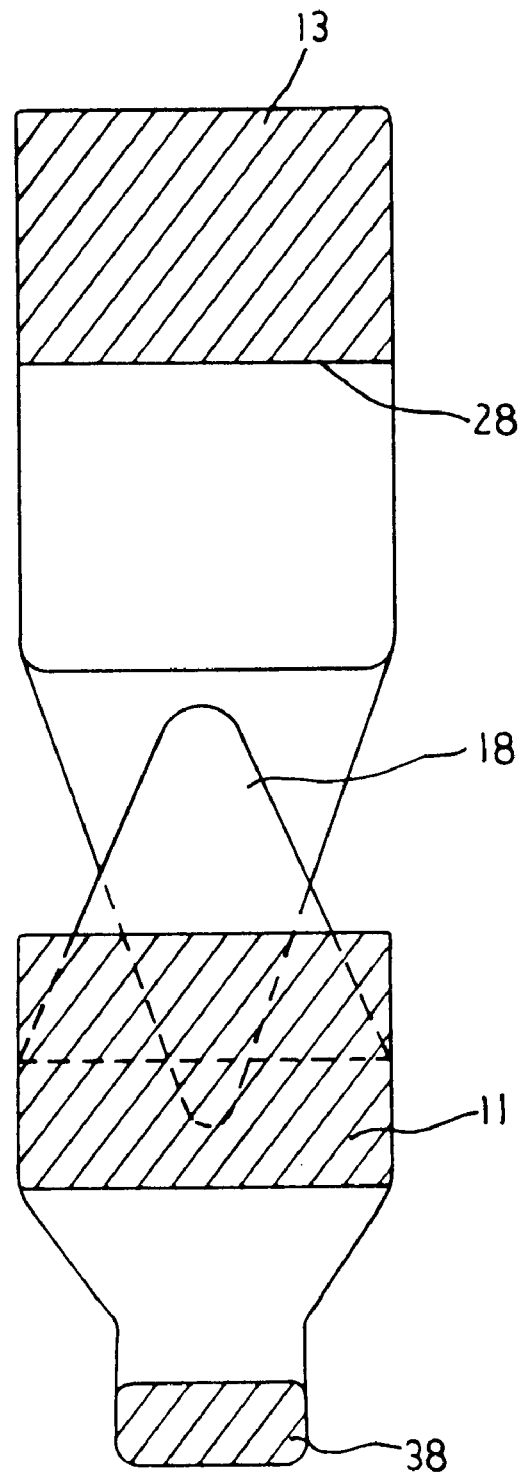
FIG. 7 is a side cross sectional view of the hook of FIG. 2 along the line D—D.

As shown in FIGS. 2 and 4, an outer edge 54 of the side member 15 includes a pin receiving and retaining channel 56 into which the pin head 42 is inserted when the pin is to be locked after being attached to the reinforcing tape. The channel 56 includes a recess 70 into which the head 42 of the pin is retained. The recess 70 is defined by an inside wall 62 of the channel 56, opposed side walls 72 and 74 and end wall 76. As shown in FIG. 5, the side walls 72 and 74 are separated by a passage 78 that is wider than the width of the third portion 40 of he pin but narrower than the head 42. The side wails 72 and 74 include shoulders 80 and 82, respectively. In such arrangement, the pin is locked in the following manner. Firstly, the head 42 is pressed upwards and against the body of the hook until the barbs 46 and 48 of the head clear the shoulders 80 and 82 and the head enters the channel 56. The pin is then released whereby the resiliency of the pin then forces the head 42 into the recess 70. As will be appreciated, the resiliency of the pin also serves to maintain the head 42 within the recess 70 when the hook is in use.

In one embodiment, the channel 56 is provided with opposed ribs 58 and 60, which are spaced from the inside wall 62 of the channel 56. Du the locking process, the ribs 58 and 60, in conjunction with the wall 62 serve to retain the pin head 42 within the channel 56 and to guide same into the recess 70. Specifically, the ribs 58 and 60 are spaced from each other such that their separation distance is slightly less than the width of the head 42. In this way, the head 42 can be snapped into the channel 56. In such position, the ribs 58 and 60 bias against the barbs 48 and 46, respectively, thereby preventing the pin head from moving transversely out of the channel 56 and also serve to ensure that the head slides into the recess 70 once released As illustrated in FIG. 2, the preferred embodiment of the invention has the pin extending along the same plane as the planar C-shaped main body 12. In this arrangement, the pin need only be manipulated in one plane in order to lock same and is designed to naturally direct itself to the body of the book when forced upward. As can be ted, when the pin is forced upward, the bend 32 is constricted thereby causing the head 42 to move upward and also towards the body of the hook. This arrangement of the pin provides an advantage over the known hooks which must be manipulated in more than one plane to be locked.

The use of the hook will now be described with reference to the figures and with reference to a preferred embodiment of the invention. Further, although a plurality of hooks are used in supporting a typical fabric roof covering, the use of the hooks will be illustrated with reference to a single hook to facilitate the description. Firstly, the pin head 42 of a hook is inserted through a reinforcing tape in a known manner. The hook is then locked by insuring the pin head 42 into the channel 56 and, subsequently, into the recess 70 (as described above), thereby securing the reinforcing tape within the cavity 52. The tape is then attached to the roof covering to be supported in a known manner. Following this step, the hook, having attached the roofing material, is then hooked onto a suspension wire by passing the wire through the channel 22 and through the opening 24. In such manner, the wire becomes contained within the cavity 17 and the hook is, thereby, attached to the wire.

As will be appreciated, the hook may be disengaged from the wire by pressing the second arm 14 into the fist cavity 17 to increase the size of the opening 24 and passing the wire there through. Additionally, the reinforcing tape may be disengaged from the cavity 52 by unlocking the pin and extracting the pin head from the reinforcing tape.

As shown in the embodiment illustrated in FIGS. 3 and 5, the pin 30 may further include a widened, thumb support portion 64 which is of a grater width than the rest of the pin 30. Such an expanded portion provides a support to facilitate the manipulation of the pin during the locking process.

In another embodiment, the hook may be of any shape while maintaining the general characteristics as the preferred embodiment described above.

As shown in the preferred embodiment best illustrated in FIG. 4, the bottom surface 28 of the top member 13 includes tapered side walls 66 and 68. Such tapering of the bottom surface 28 facilitates the hook in swiveling on the suspension wire. In this manner, the hook is prevented from binding on the wire when the roofing material is being opened or closed.

In an alternative embodiment, the arm 16 need not extend beyond past the other arm 14. In such arrangement, the channel 22 would not exist; however, the hook will still function is the desired manner.

The design of the hook according to the invention allows it to be handled by machinery thereby allowing the process of engaging the hook to the reinforcing tape and locking of same to be automated. Therefore, the hook of the present invention is capable of being sorted by an automatic machine and then automatically inserted into the reinforcing tape at specified intervals. For example, the hook is designed so that it can be sorted in a vibratory bowl (with minimal tangling) and moved along a track. When the reinforcing tape is indexed and is ready for a hook 10 to be inserted, a cylinder on the machine can push the head 42 of the pin 30 through the tape. The head 42 is then directed into the pin receiving and retaining channel 56 thereby locking the hook and preventing the reinforcing tape from being removed form the hook. The reinforcing tape can then be sewn onto the roof covering so that when the covering arrives at the job site, the hooks have already been installed and locked. The hooks, having the roof covering attached, are then snapped onto the suspension wires.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A hook for suspending a fabric roof covering from a support, said hook comprising:
   a generally planar C-shaped body, having front and rear ends, said body being defined by first and second opposed members and a third member connecting said first and second members, said first, second and third members defining a cavity with an opening on the front end of the body said cavity being adapted to receive said support; and,
   a pin extending from the first member, said pin being made of a resilient material and extending away from said opening and towards the rear end of the body;
   wherein said third member includes a means for locking the pin and wherein said means for locking the pin comprises an opening at the rear end of the body formed in the plane of said body for receiving and releasable retaining said pin therein.

2. The hook of claim 1 wherein said pin lies in the same plane as said body.

3. The hook of claim 1 wherein said pin comprises a body and a head and wherein said head is wider than the pin body.

4. The hook of claim 3 wherein said means for locking comprises a recess for receiving and retaining said pin head.

5. The hook of claim 3 wherein said opening comprising the means for locking the pin includes a first portion being adapted to receive the body of the pin and a second portion being adapted to receive the head of the pin, wherein said second portion of the opening is provided proximally to said first member, whereby when said pin is locked, said head of the pin bears against said second portion of the opening.

6. The hook of claim 5 wherein the second portion of said opening includes a pair of rear walls comprising the rear end of said hook, said rear walls each including a flange extending therefrom towards the first opening, whereby said flanges form a recess for receiving the head of said pin, thereby preventing said head from being deflected in a lateral direction.

7. The hook of claim 4 wherein said first and second members include extensions and wherein said extensions are directed towards each other thereby narrowing the opening of the body.

8. The hook of claim 7 wherein one of said extensions extends beyond the other thereby defining a channel towards said opening.

9. The hook of claim 7 wherein the extension on said second member extends beyond and overlaps the extension of said first member to define a channel towards said opening, wherein the first extension is located between the cavity and said channel.

10. The hook of claim 7 wherein one of said extensions extends beyond the other thereby defining a channel towards said opening.

11. The hook of claim 1 wherein said first and second members include extensions and wherein said extensions are directed towards each other thereby narrowing the opening of the body.

12. The hook of claim 1 wherein said cavity includes a surface for engaging said support, wherein said surface is defined by tapered side walls.

13. The hook of claim 1 wherein a second cavity is formed between said pin and said first member, said second cavity being adapted to receive a portion of said fabric roof covering.

* * * * *